Aug. 25, 1936.  X. BANISTER  2,052,071
PILE FABRIC AND THE METHOD AND APPARATUS FOR MAKING SAME
Filed Dec. 5, 1934   7 Sheets-Sheet 1
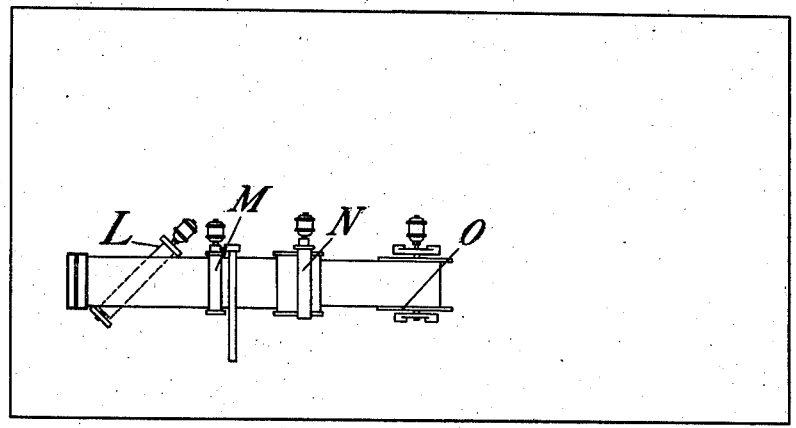
Fig.3.
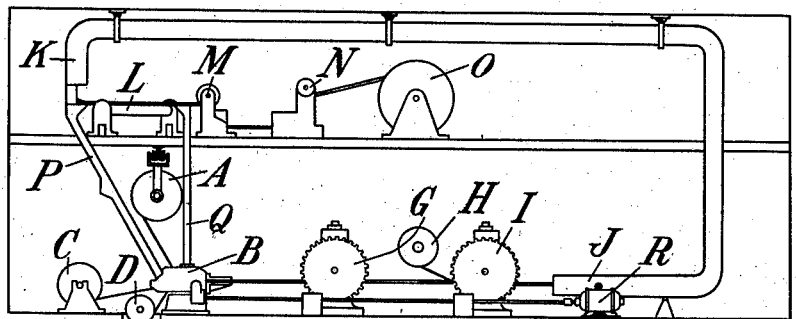
Fig.1.  Fig.2.
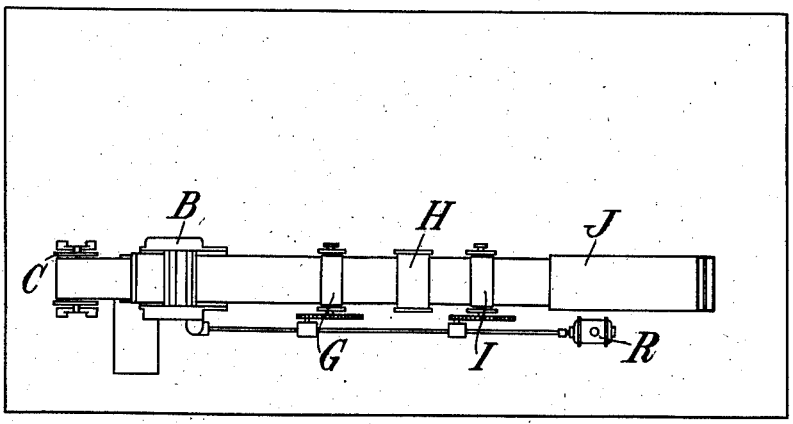
X. Banister
Inventor
By: Glascock Downing & Seebold
Attys.

Aug. 25, 1936.   X. BANISTER   2,052,071
PILE FABRIC AND THE METHOD AND APPARATUS FOR MAKING SAME
Filed Dec. 5, 1934   7 Sheets-Sheet 2
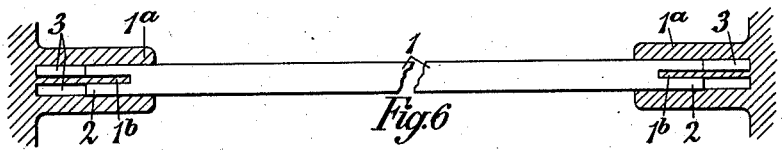
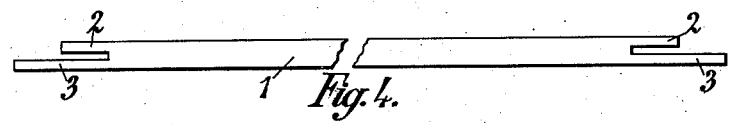
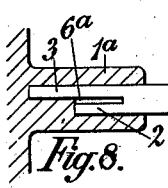
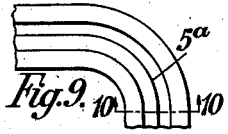
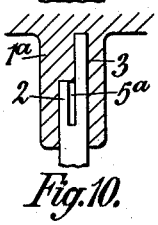
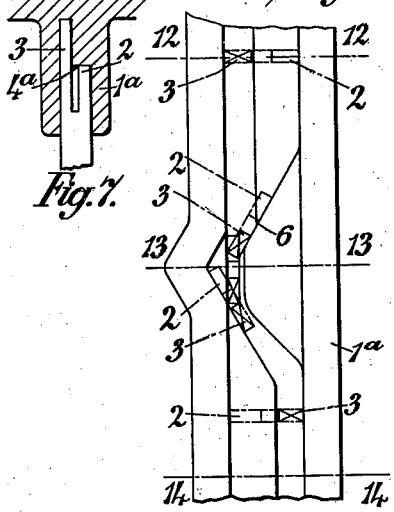
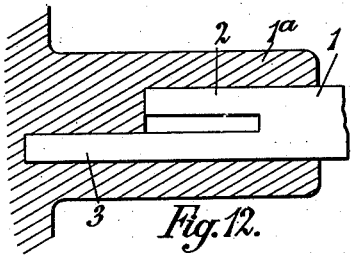
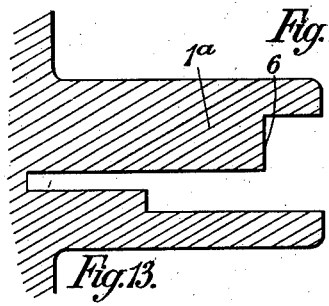
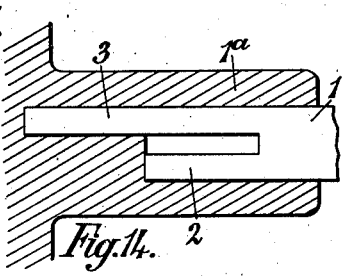
X. Banister
INVENTOR
By: Glascock Downing Seebold
Attys.

Aug. 25, 1936.  X. BANISTER  2,052,071
PILE FABRIC AND THE METHOD AND APPARATUS FOR MAKING SAME
Filed Dec. 5, 1934  7 Sheets-Sheet 3
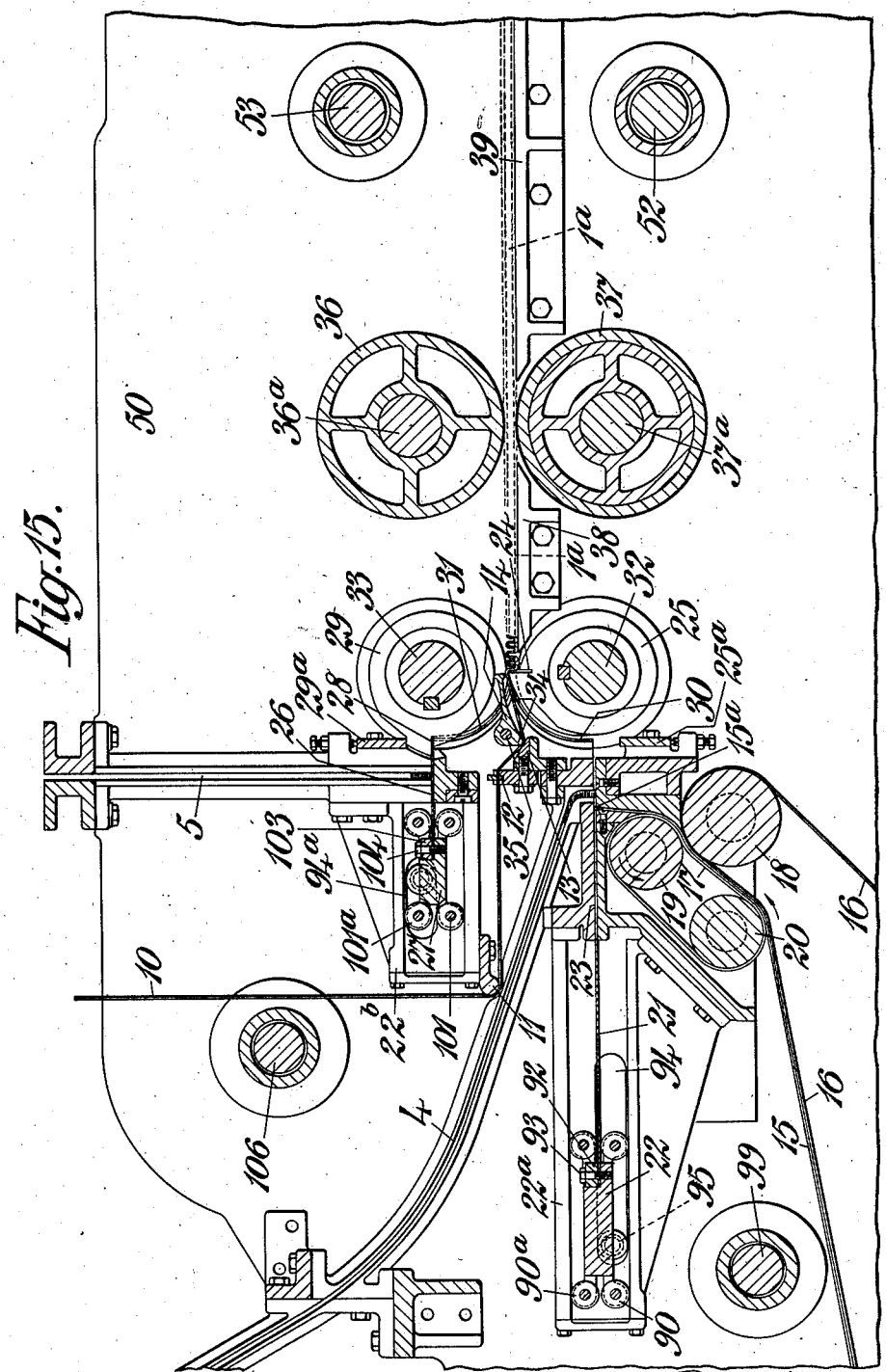

Aug. 25, 1936.   X. BANISTER   2,052,071
PILE FABRIC AND THE METHOD AND APPARATUS FOR MAKING SAME
Filed Dec. 5, 1934   7 Sheets-Sheet 4
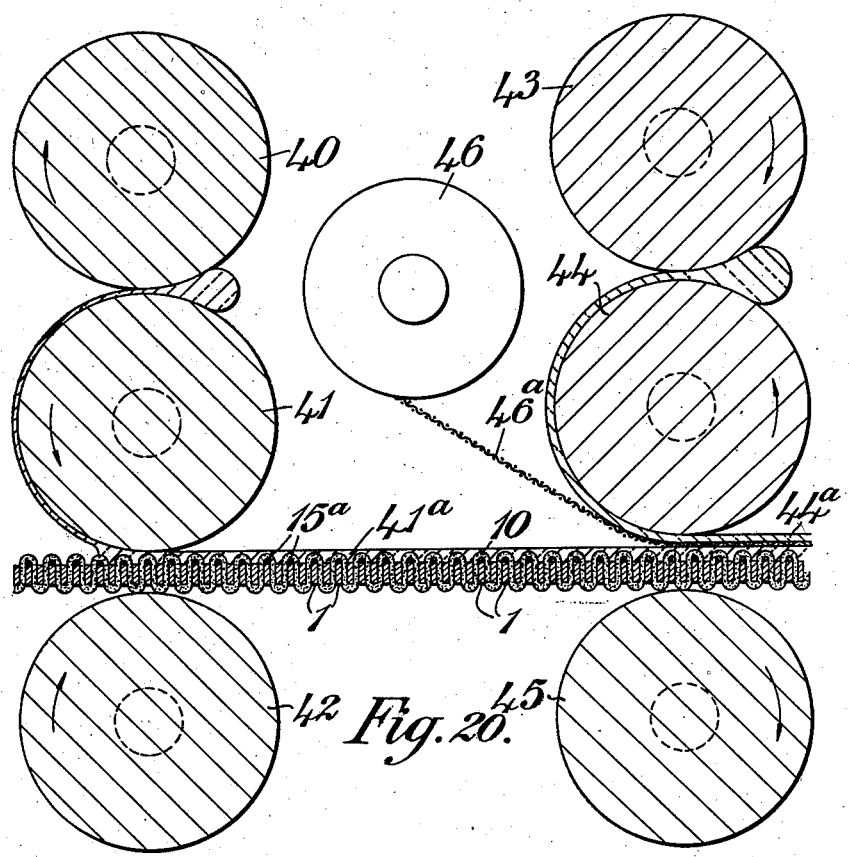
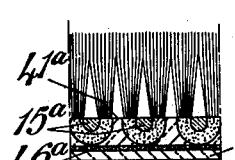
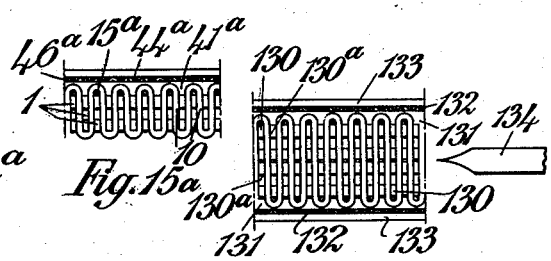

Aug. 25, 1936.  X. BANISTER  2,052,071
PILE FABRIC AND THE METHOD AND APPARATUS FOR MAKING SAME
Filed Dec. 5, 1934  7 Sheets-Sheet 7
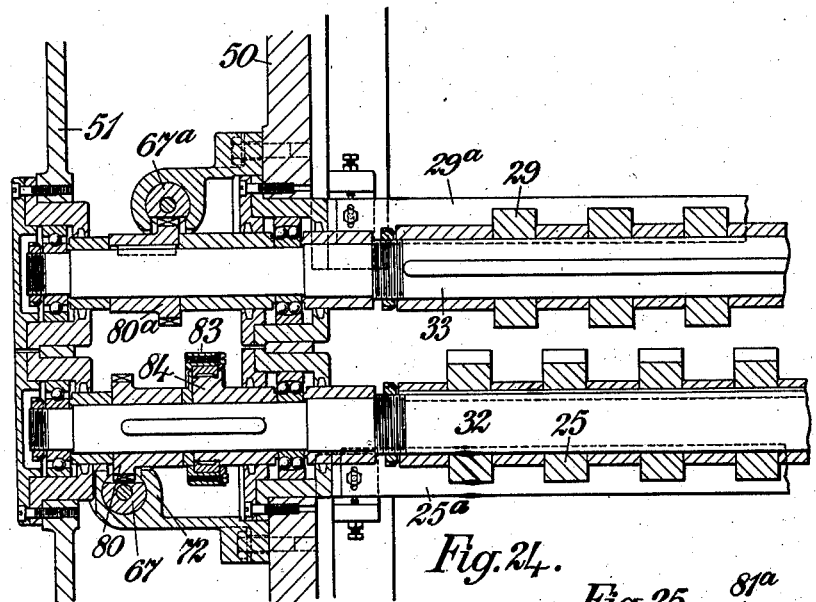
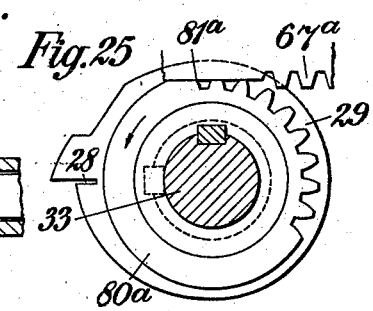
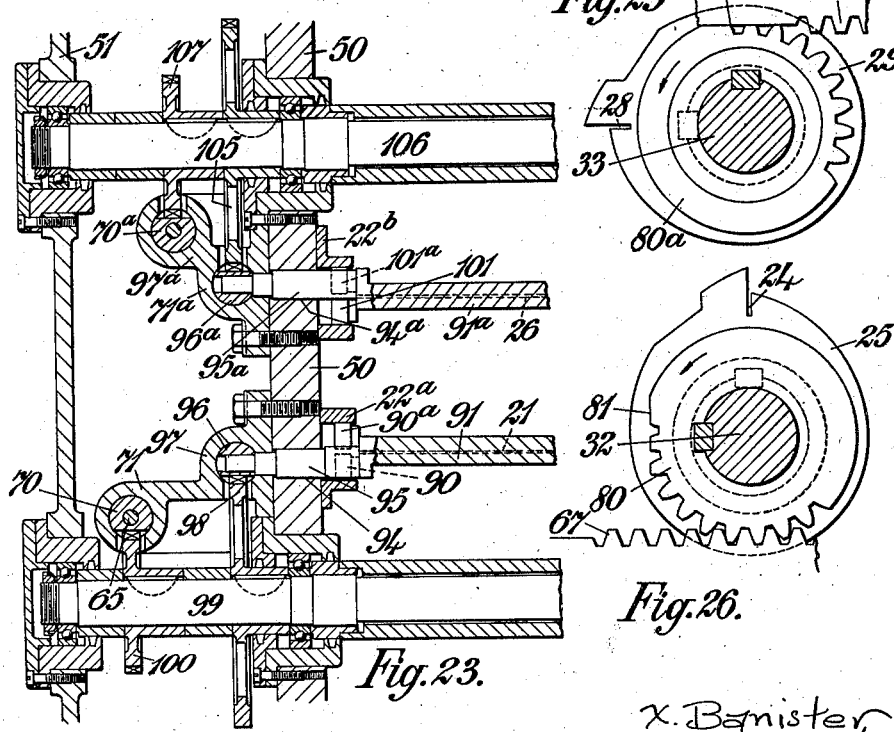
X. Banister
INVENTOR
By Glascock Downing & Seebold
Attys.

Patented Aug. 25, 1936

2,052,071

UNITED STATES PATENT OFFICE 2,052,071

PILE FABRIC AND THE METHOD AND APPARATUS FOR MAKING SAME

Xenia Banister, Braintree, England, assignor to Nikita Strachovsky, Paris, France, and Jean Felix Paulsen, Viroflay, France Application December 5, 1934, Serial No. 756,164 In Great Britain December 5, 1933

17 Claims. (Cl. 154—2)

This invention relates to the manufacture of textile fabrics and particularly to the manufacture of pile carpets or rugs, plushes or other form of fabric having a surface wholly or partly composed of pile threads or fibres.

An object of the invention is to generally improve the manufacture of textiles of this kind and to provide a method and apparatus which facilitates its manufacture and at the same time produces an article which has superior wearing qualities.

A further object of the invention is to provide improvements in the manufacture of pile fabrics from any type or quality of fibre whether it be of animal, vegetable or mineral providing such fibres are capable of being amalgamated by spinning, twisting, carding, plaiting, lapping or batting into continuous elements having the shape of threads or bands.

A further object of the invention is to provide improvements in the manufacture of pile fabrics whereby any fraying at the edges is entirely avoided.

The pile fibres according to this invention are secured in rubber or other kind of plastic substance which is capable of being rolled or shaped into sheet form and capable of being fixed or set at any stage or condition of plasticity such as by thermal or other treatment.

The invention may be carried out in a continuous series of operations of which the following, starting from the introduction of the fibre into the machine, may be considered as essential for the completion of the pile fabric excepting any subsequent steps involving dyeing operations which it may be desired to perform. The various steps of operation are as follows:—

Feeding in spacer wires about which the layer of pile fibres are to be folded.

Feeding a plastic substance such as a rubber sheet and severing therefrom a strand to form a weft thread.

Transferring the spacers and weft thread into the web or layer of fibre and folding the web about each spacer to form the pile loops.

Feeding the looped fibre and spacer wires together with the weft threads between pressure rollers.

Introducing into the looped end of the fibres a plastic substance such as rubber and forming a backing or coating which extends inwardly into intimate contact with the weft threads.

Applying to the plastic backing a layer of open mesh fabric such as burlap or sackcloth, Applying a further backing covering the burlap or sackcloth.

Passing the looped fibre with its backing through a vulcanizing tunnel whilst supporting the looped fibre by the spacer wires.

Removing alternate spacer wires from the open side of the looped fibre.

Subjecting the connecting loops on the open side to a tigering or loop opening brush.

Removing the remaining spacer wires from the opened loops.

Subjecting the opened loop fibres now forming the pile to a combing operation.

Shearing or cropping the pile to any desired depth.

To the above operations may also be added other important features of the invention comprising a particular method and mechanism for feeding the spacer wires from two different sources and returning them after each completed cycle of operation for further use and in the proper order; mechanism for introducing the rubber weft thread together with a spacer wire and transferring this into the appropriate position; mechanism for folding or looping the pile fibres and maintaining each fold from becoming slack or displaced.

Although considerable importance is attached to the method of forming the completed pile fabric and the apparatus involved in carrying out the various steps of the method, mention should be made in particular of the advantage arising out of the introduction into the pile of the weft thread which is formed of a plastic substance and which in the subsequent operation becomes amalgamated with the plastic material applied as a backing to the loops or roots of the pile. In addition also the method of introducing the wire spacers which maintain and support the looped pile throughout its progress through the subsequent operations forms an important and necessary method of producing a really satisfactory finished article.

A pile fabric manufactured in the manner hereinafter described, by reason of the peculiar nature of its backing, enables two non-textile pieces of the fabric to be joined as by sticking in a tape by a suitable adhesive instead of sewing them together in the usual manner.

Reference will now be made to the accompanying drawings in which:—

Figure 1 is a diagrammatic view in elevation of the whole plant or installation for carrying out the present invention;

Figure 2 is a diagrammatic plan view of the lower portion of Figure 1;

Figure 3 is a diagrammatic plan view of the upper portion of Figure 1;

Figure 4 is view of a spacer wire;

Figure 5 is a view of the guide formation for the spacer wires at the position at which one series of wires leaves the looped fibres.

Figure 6 is a sectional view taken on line 6—6 of Figure 5 with the spacer wires in position and supported at opposite ends by the guides.

Figure 7 is a section on line 7—7 of Figure 5;

Figure 8 is a section on line 8—8 of Figure 5.

Figure 9 represents a curved portion of the spacer wire guide at the position where the second series of spacer wires leaves the opened pile loops.

Figure 10 is a section on line 10—10 of Figure 9.

Figure 11 is a view of that portion of the guide chute where turning of the spacer wires takes place.

Figure 12 is a section on line 12—12 of Figure 11;

Figure 13 is a section on line 13—13 of Figure 11;

Figure 14 is a section on line 14—14 of Figure 11;

Figure 15 is a part sectional view of the housing containing the loop forming mechanism;

Figure 15a is an end view of a small portion of the looped pile as it enters the vulcanizing chamber.

Figure 20 is a diagrammatic view of calendering rollers adapted to apply a coating of plastic rubber to the looped pile, a layer of open mesh fabric and a further backing of rubber;

Figure 21 is a sectional side view of the finished pile fabric;

Figure 23 is a section on the line 23—23 of Figure 22;

Figure 24 is a section on the line 24—24 of Figure 22;

Figure 25 is an end elevation of the upper cam member and gear wheel;

Figure 26 is an end elevation of the lower cam member and gear wheel;

Figure 27 is a modified form of pile forming arrangement.

Figure 16:
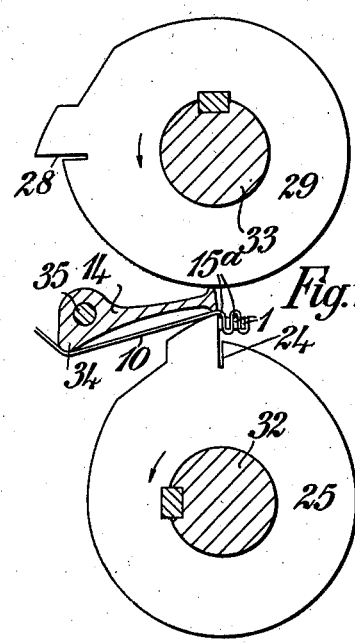
Figures 16, 17, 18 and 19 show different positions of the loop forming mechanism.

In the layout shown in Figures 1, 2 and 3, a reel of stock comprising a continuous layer of any suitable form of fibre is shown at A and which is fed into a housing B where the preliminary operations of looping the fibre are performed. A rubber sheet carrying roller is represented at C, the sheet being supported as it leaves the roller by a web which is subsequently wound upon the reel D. The fibre is looped within the housing B and passes between supporting and pressure rollers and next enters calender rollers G where a preliminary coating or backing of plastic rubber is frictioned into the looped fibre. A roll of open mesh fabric such as sackcloth or burlap is indicated at H, and a further coating or backing applied by rollers indicated at I is added to the existing plastic rubber coating simultaneously with the open mesh fabric. The looped pile is next fed whilst still being supported by the spacer wires through a vulcanizing trunk or chamber J extending upwardly to a return bend, the looped fibre then emerging at K from which it passes into contact with a loop opening brush L, a combing brush M, a shearing or cropping machine N and is finally wound off in its finished condition on to a roller O. Return chutes are shown at P and Q respectively which lead the spacer wires back to the appropriate position in the housing for further use.

A main drive is indicated at R for the various pile forming, feeding and coating operations as shown diagrammatically in Figure 2, whilst separate driving motors are provided (see Figure 3) for the loop opening brush, the combing machine, the shearing or cropping device and the final take-off roller. Suitable means may be provided for heating the calender rollers and cropping or shearing machine as desired.

*Spacer wires and guides*

The spacer wires 1 shown in Figures 4 to 7 are supported in guide channels 1a formed with a central fin 1b and each is provided with two prongs at each end which extend on either side of the fin 1b as shown in Figure 6. Each of the spacers is provided with a short prong and a long prong, numbered respectively 2 and 3, and when fed into the position where the operation of folding the weft fibre takes place one set of alternate spacer wires have their longer prong 3 foremost, whilst the other series of alternate spacers have their longer prong 3 to the rear. The spacer wires travel down chutes 4 and 5 (see Figure 15) which are formed as guide channels, those proceeding down the chute 4 being the bottom spacer wires and those proceeding down the chute 5 being the top spacer wires. The guides for the spacer wires as shown in Figure 6 extend from the position where the pile fibre is formed into loops through the vulcanizing chamber J to the position as indicated at K of Figure 1. At this point the spacer wires are separated, the bottom spacer wires being guided away from the looped material. In Figures 5 and 7 the guide formation employed at the point K is shown where the lower spacer wires will be led into the chute P by means of the guide portion 4a and then into the chute 4 (see Figure 15) down which they travel for further use in loop forming operations.

It is necessary that the bottom spacer wires shall be fed to the loop forming position with their longer prong foremost and it is therefore necessary when they are travelling down the chute P that they should be turned, the means for accomplishing this being shown in Figures 11 to 14. Situated within the path of the spacer wires is an inclined projection 6 against which one side or longitudinal edge of each wire abuts, as it travels down the guide under the action of gravity. The upper longitudinal side is thus retarded whilst the lower longitudinal side advances so that it occupies the different positions indicated in dotted lines, until a complete reversal or turning of the wires takes place, the longer prong of each wire finally occupying the foremost position when the wire arrives at the bottom of the chute P. The sectional view shown in Figure 12 indicates the position of the spacer wire as it enters the chute P. Figure 13 shows the formation of the guides with the inclined projection 6, whilst Figure 14 shows the position of the spacer wire after it has turned in passing the inclined projection.

The top spacer wires from the position indicated in Figure 5 travel with the looped fibre into the horizontal guide portion 6a until the looped fibre is brought into position opposite the loop opening brush L of Figure 1. After being freed from the pile by the opening of the loops the top spacer wires are fed down the chute Q of Figure 1 by means of the guide portion 5a (see Figure 9) and then down the chute 6 where they are again used for further loop forming.

The above describes the complete paths traversed by the spacer wires but omits any reference to their manipulation after arriving at the bottom of the chutes 4 and 6 and prior to entering the guide 1a along which they travel in carrying the loop pile fibres. Reference to this is made in the description of the loop forming operation later.

*Feeding means for loop forming*

The material for forming the loops is drawn from the reel A (Figure 1) and enters the upper side of the housing B. This material which is composed of fibres arranged in a continuous layer is shown at 10 in Figure 15 as extending downwardly and passes around a curved projection 11 and then over a further projection 12 from which it extends downwardly on to a sill 13 under a loop folding device 14.

A web of rubber 15 passes from the roll C supported by a liner 16 made of any suitable material and is brought into contact with a conveyor belt 17 which feeds the rubber web up to a position where a relatively thin strand 15a is severed therefrom to form a weft thread for the pile loops. As the rubber web is fed upwardly the supporting liner 16 passes away over the roll 18 and is wound upon the reel D. The conveyor belt 17 passes over pulleys 19 and 20 and is given an intermittent feeding movement by means of a pawl and ratchet arrangement to be described later.

The spacer wires occupying a position in the chute 4 are fed forward singly by means of a plunger 21 which is mounted on a carriage 22. In making its forward movement the plunger 21 severs the thin strand 15a from the rubber web projecting into the shallow slot 23, and carries this forward into contact with one of the spacer wires, both the rubber thread 15a and the spacer being projected into a slot 24 in the cam 25 when the former is in its appropriate position to receive them.

The spacer wires in the chute 6 are also moved singly forward by a plunger 26 mounted on a carriage 27, the spacer wires being projected into the slot 28 of the cam 29 as shown in Figure 15. The means for reciprocating the carriages 22 and 27 will be described later.

*Loop forming mechanism*

As both upper and lower sets of spacer wires are fed forwardly by their respective plungers into the cam slots 24 and 28 they will be brought into register with curved guides 30 and 31 which merge into the horizontal guide 1a previously referred to. The particular use of these guides 30 and 31 is to ensure that the spacer wires do not become displaced from the slots and further they serve to maintain the spacer wires from downward movement as the pile fibres are being folded.

The cams 25 and 29 are keyed upon shafts 32 and 33 and are alternately oscillated through an angle of approximately 90° and in the position shown in Figure 15 the cam 25 is at the completion of its upward movement whilst the other cam 29 is shown at the limit of its upward movement. The outward movement of each cam is limited by stops 25a and 29a respectively.

Figure 17:
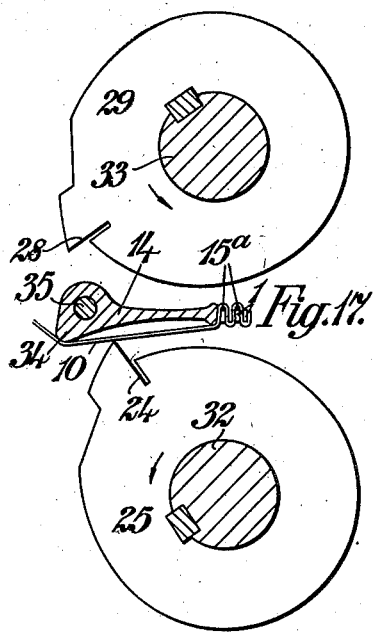
Figure 18:
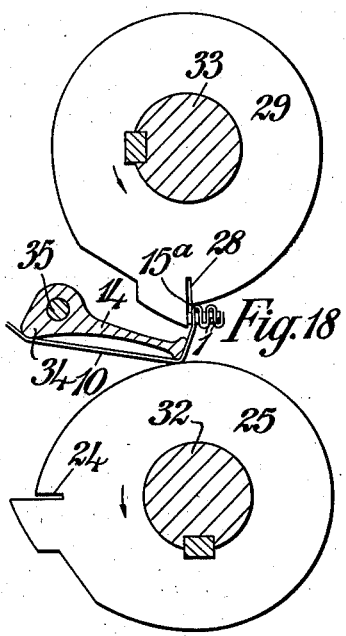
Figure 19:
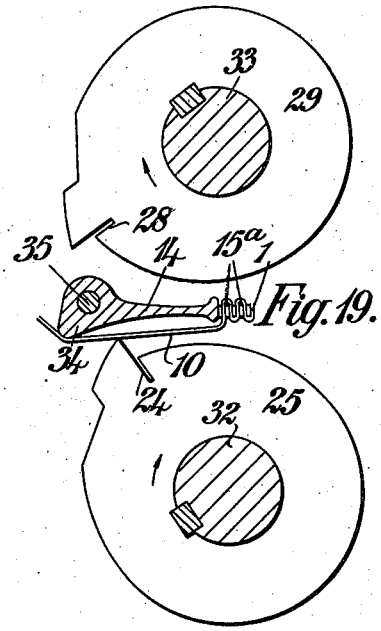

Referring in particular to the Figures 16, 17, 18 and 19, the cams in Figure 16 are shown in a similar position to that shown in Figure 15. In Figure 17 the cam 25 is moving downwardly whilst the forward edge of the loop folder 14 has also descended against the side of the loop against which it presses during its downward travel. The cam 29 is also moving downwardly to bring a spacer wire into contact with side of the folded pile as shown in Figure 18. In this latter figure also the lower cam 25 is in a position to receive a spacer wire together with a rubber weft thread and in Figure 19 the lower cam is shown partaking of its upward movement, the completion of which moves the pile fibre about the spacer previously brought into the position shown by the upper cam. The loop folder 14 which is moved in timed relation with the cams serves to fold the pile fibres downwardly on to the spacer wire and rubber weft thread brought into position by the lower cam and also abuts against the spacer wire fed by the upper cam, and in performing these functions it also maintains by means of its heel portion 34 the layer of pile fibers substantially taut.

The loop folder 14 is mounted upon a shaft 35 from which it derives a limited oscillatory movement by means hereinafter described.

*Mechanism for applying a backing to the looped fibres*

Figure 22:
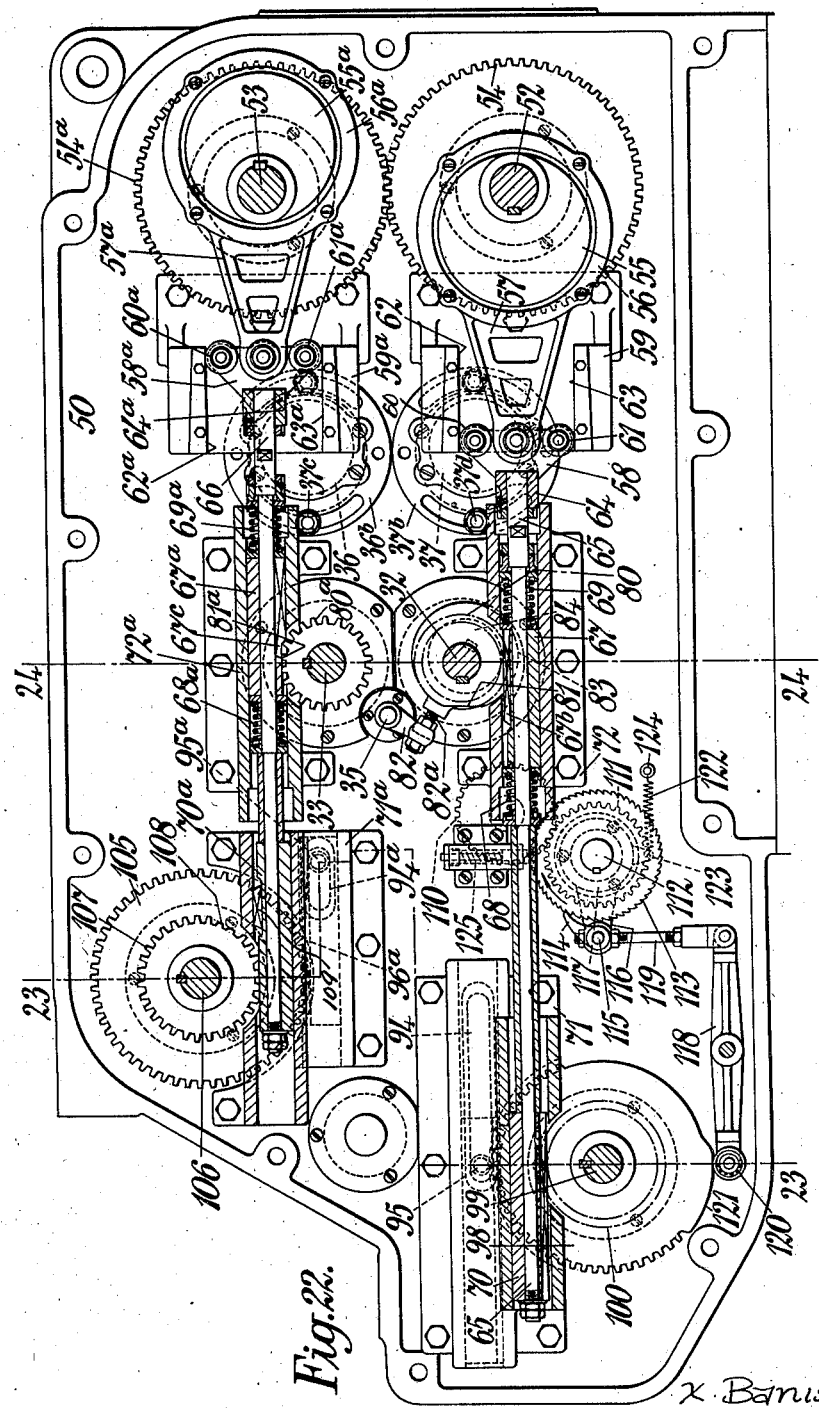
Figure 22 is an outside view partly in section of one of the inner casings showing the driving mechanism for operating the pile looping devices.

After the fibres have been formed into loops they are fed together with their spacer wires along the guides 1a, as shown in Figure 15, and are partly supported by a platform 38 before entering between a pair of rollers 36 and 37. The roller 36 is preferably a bare steel roller mounted upon a shaft 36a, whilst the roller 37 which is mounted upon a shaft 37a is a rubber-coated steel roller, the function of these two rollers being to flatten or smooth out the loops which have been formed. Provision is made for varying the distance between the rollers 36 and 37 and such, as is shown in Figure 22, comprises eccentric bearings 36b and 37b arranged at each end of the rollers. By loosening the nuts 37c and 37d and turning the bearing housing a slight adjustment of the rollers may be made.

After passing the rollers the looped fibre is fed along a further platform 39 towards the coating rollers referred to as G in the diagrammatic view of Figure 1. These rollers are shown in Figure 20 and comprise two upper rollers 40 and 41 and a lower roller 42.

The roller 41 applies a coating 41a of plastic material, preferably rubber, to the upper surface of the looped pile. This plastic material is squeezed between the rollers 40 and 41 and is rolled out into a substantially thin layer as it is fed between them.

The speed of the rollers 40 and 41 is greater than that of the roller 42 and also greater than the speed or rate of travel of the looped fibre. By this means the roller 41 by the friction set up forces the plastic rubber 41a into the surface of the looped pile to such a degree that it will completely surround the roots of the pile and also the rubber weft thread which is situated in the bases of the loops. By altering the distance between the rollers 40 and 41 any required thickness of rubber coating may be applied to the pile.

The coated pile passes towards a further set of rollers 43, 44 and 45 (I of Figure 1) and also passes beneath a reel 46 (this reel being shown at H in Figure 1) upon which is wound a web of open mesh fabric 46a such as sackcloth or burlap. The speeds of travel of the rollers 44 and 45 corresponds with that of the pile and as the latter passes between these rollers the fabric backing is applied to the existing plastic coating simultaneously with the application of a further backing 44c which is preferably in the form of sheet rubber of any desired thickness. The thickness of the rubber sheet may be regulated by varying the distance between the rollers 43 and 44 so that a coating of any desired thickness may be applied at this point.

It may here be mentioned that this rubber coating may be relatively thick and be similar to sponge rubber, so that there would be no necessity to use the usual felt undercarpet or lining commonly employed with carpets.

By employing sackcloth or burlap with a substantially free or open mesh the base coating 44a will adhere to that of the plastic coating on the looped pile and during the subsequent vulcanizing operation these become amalgamated, the fabric reinforcement adding a degree of strength to the pile fabric as a whole. This also acts to limit its natural elasticity.

After passing between the rollers 43 and 45 the coated pile fabric then enters a vulcanizing tunnel J of Figure 1 and eventually emerges at the point K as before described, and passes above the brush L which effects the opening of the loops which up to this point imprisoned the top set of spacer wires. The bottom spacer wires had already been released before the pile came immediately above the brush L and will have descended the chute P and the guide 4 for further use as shown in Figure 15.

After passing the brush L the pile fabric from which both sets of spacer wires have now been removed is led through the combing machine M and is then passed to the shearing or cropping machine N before being wound off on to the reel O as a finished fabric.

The loop opening brush L, the combing brush M and the shearing or pile cropping machine N may be of the ordinary type used in the manufacture of pile fabrics and are therefore not described in detail.

In Figure 21 is shown a small section of the completed pile fabric in the condition in which it will be wound on to the roller O. It will be seen that the roots of the pile are embedded in the rubber backing 41a to a substantial degree and also that the rubber weft threads 15a which serve to hold the embedded pile loops are also surrounded by the rubber backing. Furthermore the wide mesh fabric is anchored between the rubber backing 41a and the final or base backing 44a due to the substantial amalgamation of the rubber which takes place during the passage of the pile fabric through the vulcanizing chamber.

*Drive for fibre feed and looping mechanism*

The pile fibre feed and looping mechanism is situated within the housing B the general construction of which is shown in Figures 22, 23 and 24.

The housing comprises inner walls 50 and outer walls 51, one of each wall only being shown in Figures 23 and 24. The inner walls are spaced apart a distance sufficient to accommodate the pile fabric of any desired width and support between them in appropriate antifriction bearings, the shafts carrying the loop forming mechanism, the pressure rollers and the conveyor for the rubber sheeting from which the weft thread is sheared. The inner faces of walls 50 support the guides 4 and 5 for the wire spacers and also the horizontal guide 1a along which the spacers pass carrying the looped fibre.

Two main driving shafts 52 and 53 are provided which are geared together by similar sized gear wheels 54 and 54a. The shafts 52, 53 carry eccentrics which comprise sheaves 55, 55a, straps 56, 56a and arms 57, 57a pivotally connected to crossheads 58, 58a guided in brackets 59, 59a by means of rollers 60, 60a and 61, 61a, which bear upon the oppositely facing guide surfaces 62, 63 and 62a, 63a of the brackets 59, 59a.

The crossheads each terminate in a boss 64, 64a which are secured to rack shafts 65 and 66 respectively. Carried upon these shafts are racks 67 and 67a of a similar character, which abut at their ends against springs 68, 69 and 68a 69a so as to provide a substantially resilient drive to the gear wheels with which they engage. The rack shafts 65 and 66 also carry racks 70, 70a which are rigidly fixed to the shafts against axial movement.

The lower racks 67 and 70 are supported in brackets 71 and 72 and the upper racks 67a and 70a are supported in brackets 71a and 72a all of said brackets being attached to the exterior of the inner wall 50 as shown in Figures 23 and 24.

The rack shaft mechanism as described and including the eccentrics on the main driving shafts are duplicated, that is to say, a similar arrangement is provided on the outer face of the corresponding inner wall of the housing so that the shafts carrying the feeding and loop forming mechanism will be driven from opposite ends in order to avoid torsional strains in the shafts.

The cams 25 and 29 are keyed to their respective shafts and are arranged in any particular number according to width and nature of the fabric which is being employed. It is obvious that one single cam element might be employed of an appropriate length but it is preferable to employ a series of similar shape cams spaced apart with the upper alternating with those of the lower series as shown in Figure 24. Mounted upon the cam shafts 32 and 33 are gears 80 and 80a (see Figures 24 and 26) which are adapted to mesh with the racks 67 and 67a respectively and from which they derive their oscillatory movement. Both gears have a flattened portion 81 and 81a with abbreviated teeth so that as the movement of their respective racks brings them alternately into the position already described in which their cams receive the upper and lower spacer wires, the racks will continue to move without communicating any movement to the cams through their respective cam shafts. The rack teeth are also cut away at 67b and 67c in order to accommodate this dwell period of the cams.

The means for oscillating the loop folder shaft 35 is shown in Figure 22 and comprises an arm 82 to which is attached a screwed extension of an eccentric strap 83 of an eccentric sheave 84 keyed on the cam shaft 32. The movement of the loop folder will thus be in timed relation with the movements of the cam members previously described.

*Plunger operating mechanism*

The plunger carriage 22 as shown in Figure 15 is guided in a frame 22a by means of upper and lower wheels 90, 90a. Extending transversely across from one inner wall to the other as shown in Figure 23 is a substantially flat member 91 which carries the plunger 21 the latter being secured thereto by means of a holding down strip 92 and a bolt 93. An opening 94 is provided in the wall 50, and through which projects an extension 95 and by means of which the carriage at each end of the member 91 is reciprocated to and fro. The end of the extension 95 fits into a rack supported in the bracket 97, the rack 96 being in mesh with a wheel 98 keyed upon the shaft 99. Upon the shaft 99 is also keyed a further gear wheel 100 which is in mesh with the rack 70 shown in Figure 22. The movement of the rack 70 is, by means of the gears 98 and 100, multiplied to give a relatively long reciprocatory movement to the carriage and plunger as compared with the travel of the rack 70.

The upper plunger 26 is carried upon the carriage 27 the latter being provided with upper and lower wheels 101 and 101a guided in a frame 22b secured to the side of the spacer wire chute 5. The plunger is secured to the carriage by a holding down strip 103 and bolt 104.

An opening 94a is provided in the wall 50 through which projects an extension 95a, the extremity of which is secured to a rack 96a in a similar manner to that of the lower carriage assembly already described.

Gearing with the rack 96a is a wheel 105 keyed on a shaft 106 and a second gear wheel also keyed on the shaft meshing with a rack 70a and through which movement is transmitted to the carriage 27. The plunger blade 26 has a relatively short stroke and in view of this only a limited portion of the full stroke of the rack 70a is communicated to the gear wheel 27. Such limited movement is obtained by providing on the gear 107 a flat or abbreviated tooth portion 108 and also a limited number of teeth 109 on the rack and by this means only a relatively small angular movement is communicated to the gear wheel 107, the shaft 106 and gear 105, which results in a relatively short stroke of the plunger blade 26.

Feeding means for rubbered sheet

Provision is made for imparting to the conveyor belt 17 (see Figure 15) an intermittent movement so that the rubber sheet 15 shall be moved upwardly a distance substantially equal to the depth of the slot 23 and for this purpose there is arranged upon the shaft 19a of the roller 19 a gear wheel 110 which meshes with a gear wheel 111 secured upon a shaft 112. The shaft 112 carries a ratchet wheel 113 which is fed in a clockwise direction by a pawl 114 secured upon a shaft 115. The shaft 115 is supported by the arm 116 of a yoke 117 which surrounds the shaft 112 and the pawl 114 is given an upward feeding movement by means of a lever 118. One end of this lever is connected to the arm 116 by a link 119 whilst the opposite end is rocked by means of a roller 120 which bears against a cam surface 121 provided on the lower periphery of the wheel 98. A spring 122 is secured at one end to an arm 123 of the yoke 117 the other end being attached to a stop 124 formed on the side wall. After each intermittent feeding movement of the pawl the spring assists in returning the pawl by reason of its pull on the yoke arm to the downward position after the cam 121 has been moved out of contact with the roller 120.

A spring-pressed plunger 125 bears on the teeth of the ratchet wheel 113 and prevents any return movement of the ratchet wheel.

A modified method of forming the pile loops is shown in Figure 27. In this form of the invention the pile fibre is folded about two abutting wires 130 and 130a and each loop is provided with a rubber weft thread which is introduced with one of the spacer wires 130 as the pile fibre is folded. The loops as shown are secured in a base formed of a rubber coating 131 which is in amalgamation with an open mesh fabric 132 and an outer coating of rubber 133, such being applied in the manner already described.

The looped pile fibre after passing through a vulcanizing chamber could be severed by means of a blade indicated diagrammatically at 134, the severing of the pile thus releasing the spacer wires. This method of loop forming avoids the use of a loop opening brush, and the pile thus formed could pass directly to a combing machine after leaving the vulcanizing chamber.

In addition to this it will not be found essential to pass the pile into contact with a shearing or cropping machine as the blade 134 would sever the pile uniformly removing the necessity for any subsequent cropping operation.

According to a modification, instead of applying a preliminary coating of plastic rubber to the looped pile by means of calender rolls it is within the scope of the present invention to substitute for this rubber in a liquid or semi-liquid condition which might be sprayed on to the looped pile and spread by means of a doctor blade of known type.

In conclusion the importance of providing a weft thread and backing of a similar chemical nature must be considered, as of utmost importance in carrying out the present invention. As has been clearly pointed out these will combine to securely hold the pile elements by reason of the amalgamation which takes place during the application of heat in the vulcanizing chamber.

I claim:

1. In the manufacture of pile fabrics wherein the pile material is fed as a continuous layer and formed into loops, introducing a rubber weft thread at the base of said loops, applying a rubber coating at the back of said loops, and amalgamating said weft thread with said coating during the applicaiton of said coating to the loops.

2. In the manufacture of pile fabrics wherein the pile material is fed as a continuous layer and is formed into alternate loops by loop-forming mechanism including spacer wires, introducing a plastic weft thread with a spacer wire in forming a loop, applying a plastic backing to said loops, forcing the plastic backing into intimate contact with the roots of the loops and with the plastic weft thread and consolidating the plastic backing with the plastic weft thread by the application of heat.

3. The manufacture of pile fabrics comprising feeding the pile material in a continuous layer, forming said layer with alternately and oppositely facing loops by means including spacer wires, feeding in a rubber weft thread simultaneously with alternate spacer wires, applying a plastic rubber backing to the roots of said loops and into intimate contact with the said weft threads and consolidating the plastic rubber backing with the rubber thread by vulcanization.

4. The manufacture of pile fabrics comprising reinforcing the pile loops with rubber weft threads, feeding the reinforced pile loops between calendering rollers having different peripheral speeds, applying a coating of plastic rubber to the roots of the pile loops by means of the calendering roller rotating at the greater speed and amalgamating said plastic rubber coating and said reinforcing rubber weft threads.

5. The manufacture of pile fabrics comprising reinforcing the pile loops with plastic weft threads, feeding the reinforced pile loops under a doctor blade of a spreading machine, applying a coating of plastic solution to the roots of the pile loops by means of the doctor blade of the spreading machine and amalgamating said coating of plastic solution with the reinforcing plastic weft threads.

6. The manufacture of pile fabrics comprising forming pile loops by the aid of spacer wires introducing a rubber weft thread into alternate loops, feeding said looped fabric and said spacer wires between calendering rolls whilst applying a plastic rubber backing to said loops, and subsequently feeding said looped fabric to a vulcanizing chamber to consolidate the plastic rubber backing with the rubber thread whilst retaining said spacer wires within said looped fabric.

7. The manufacture of pile fabrics comprising means including spacer wires for forming a layer of pile material into loops, means for introducing a rubber weft thread into alternate loops, means for applying plastic rubber to the roots of said loops and to form a longitudinally extending backing integral with the rubber weft threads, applying to said backing so formed an open mesh fabric and covering said fabric with a rubber backing.

8. The manufacture of pile fabrics comprising means including spacer wires for forming a layer of pile material into loops, means for introducing a reinforcing thread into alternate loops during their formation, means for applying plastic rubber to said loops and into intimate contact with the reinforcing thread, applying to said backing an open mesh fabric simultaneously with the application of a second backing formed of sheet rubber and consolidating said backings by vulcanization.

9. The manufacture of pile fabrics comprising means including spacer wires for forming a layer of pile material into loops, means for introducing a reinforcing thread into alternate loops during their formation, means for applying plastic rubber to said loops and into intimate contact with the reinforcing thread, applying to said backing an open mesh fabric simultaneously with the application of a second backing formed of sponge rubber and consolidating said backing by vulcanization, thereby producing a pile fabric requiring no undercarpeting or padding of felt or similar substance required for producing softness.

10. The manufacture of pile fabrics comprising means for feeding a continuous layer of pile material, means for forming said pile material into loops, the said means including spacer wires, means for introducing a reinforcing rubber weft thread into alternate loops, means for applying a preliminary rubber backing to said loops, means for simultaneously applying an open mesh fabric and a second rubber backing to said pile material and means supporting said pile material including said spacer wires during the application of said preliminary and second rubber backings.

11. The manufacture of pile fabrics from a continuous layer of pile material wherein means are provided for forming the pile material into loops comprising alternately acting members, feeding spacer wires upon opposite sides of the pile material and transversely thereto, means for feeding a rubber weft thread with said spacer wires and means for folding said pile material about said spacer wires to form oppositely facing pile loops and means for applying a plastic rubber backing to said pile loops into intimate contact with said rubber weft threads.

12. The manufacture of pile fabrics from a layer of pile material comprising means for feeding a rubber thread into contact with a loop-forming spacer wire, means for feeding said weft thread and said spacer wire against one side of said pile material, means for folding said pile material about said spacer wire and said weft thread and means for feeding a spacer wire alone against said folded part of the pile material.

13. The manufacture of pile fabrics from a layer of pile material comprising means for feeding singly loop-forming spacer wires alternately from two separate sources, means for guiding said spacer wires in conjunction with a rubber weft thread extending along one longitudinal edge thereof into contact with the pile-forming material, and means for retaining said spacer wires within said looped material during the application of a plastic rubber backing and a subsequent vulcanizing operation.

14. The manufacture of pile fabrics from a layer of pile material comprising means for feeding loop spacer wires from two separate sources into proximity to loop-forming means, means for feeding a sheet of plastic substance, means for shearing from said sheet a relatively narrow strand and for delivering the same together with a loop spacer wire to an intermittently operating member adapted to place said spacer wire and said strand of plastic substance against one side of the pile material, and means for wrapping the pile material about said spacer wire and said strand with the strand positioned in the base of the loop.

15. The manufacture of pile fabrics from pile material comprising means for feeding alternately spacer wires from two sources, means for feeding a rubber weft thread with alternate spacers, means for forming a loop about each of said spacers, means for guiding said looped material between rollers adapted to apply to one side thereof a rubber backing, means for introducing between said backing and a rubber base an open mesh fabric, amalgamating said rubber weft thread and said rubber backing by vulcanizing, removing alternate spacer wires from the looped material and returning the same to one of said sources, guiding said looped material into contact with a loop opening brush, removing the remaining alternate wire spacers from the opened loops of the material and returning the same to the other of said sources.

16. A pile fabric having the pile material anchored by means of a weft thread, a backing amalgamated with said weft thread and surrounding the roots of said pile material loops, the weft thread and backing being composed of elements having the property of fusing together upon the application of heat.

17. A pile fabric having the pile material anchored by means of a rubber weft thread, a rubber backing amalgamated with said rubber weft thread and surrounding the roots of said pile material.

XENIA BANISTER.